(12) United States Patent
Rasmussen

(10) Patent No.: US 6,910,443 B2
(45) Date of Patent: Jun. 28, 2005

(54) AUTOMATIC FEEDING DEVICE

(75) Inventor: Henrik Rasmussen, Nykøbing Sjælland (DK)

(73) Assignee: Egebjerg Maskinfabrik A/S, Nykøbing Sjælland (DK)

( * ) Notice: Subject to any disclaimer, the term of this patent is extended or adjusted under 35 U.S.C. 154(b) by 0 days.

(21) Appl. No.: 10/276,256

(22) PCT Filed: May 15, 2001

(86) PCT No.: PCT/DK01/00339

§ 371 (c)(1),
(2), (4) Date: Nov. 15, 2002

(87) PCT Pub. No.: WO01/87053

PCT Pub. Date: Nov. 22, 2001

(65) Prior Publication Data

US 2003/0145796 A1 Aug. 7, 2003

(30) Foreign Application Priority Data

May 15, 2000 (DK) .................................. PA 2000 00787

(51) Int. Cl.[7] .............................................. A01K 5/02
(52) U.S. Cl. ..................................... 119/53.5; 119/52.1
(58) Field of Search ........................... 119/51.01, 51.03, 119/51.5, 52.1, 52.4, 53, 53.5, 54, 55, 61

(56) References Cited

U.S. PATENT DOCUMENTS

| | | | | | |
|---|---|---|---|---|---|
| 1,199,655 | A | * | 9/1916 | Battle | 119/54 |
| 1,269,108 | A | * | 6/1918 | Nichols | 119/53.5 |
| 2,808,029 | A | * | 10/1957 | Geerlings | 119/53.5 |
| 3,613,641 | A | * | 10/1971 | Geerlings | 119/51.11 |
| 4,353,329 | A | * | 10/1982 | Thibault | 119/52.1 |
| 4,444,151 | A | * | 4/1984 | Bohlmann | 119/53.5 |
| 4,462,338 | A | * | 7/1984 | Thibault | 119/53.5 |
| 4,582,023 | A | * | 4/1986 | Zumbahlen et al. | 119/53.5 |
| 4,719,875 | A | * | 1/1988 | Van Gilst | 119/53.5 |
| 4,729,344 | A | * | 3/1988 | Winkel | 119/53.5 |
| 4,889,078 | A | * | 12/1989 | Smiley | 119/53.5 |
| 5,138,979 | A | * | 8/1992 | Baird et al. | 119/51.04 |
| 5,243,930 | A | | 9/1993 | Rahm | |
| 5,245,949 | A | * | 9/1993 | Hively | 119/53 |
| 5,275,130 | A | * | 1/1994 | Muckler | 119/53.5 |
| 5,353,739 | A | * | 10/1994 | Chu | 119/51.03 |
| 5,435,267 | A | * | 7/1995 | Patterson | 119/52.4 |
| 5,447,119 | A | * | 9/1995 | Rasmussen | 119/51.5 |
| 5,606,934 | A | * | 3/1997 | Brisby | 119/53.5 |

(Continued)

FOREIGN PATENT DOCUMENTS

| | | |
|---|---|---|
| DK | 94 00446 | 3/1996 |
| DK | PR172554 | 1/1999 |
| EP | 0346581 | * 12/1989 |

*Primary Examiner*—Peter M. Poon
*Assistant Examiner*—David Parsley
(74) *Attorney, Agent, or Firm*—James Creighton Wray; Meera P. Narasimhan

(57) ABSTRACT

There is disclosed a device (1) for automatic feeding of animals, preferably pigs. The device comprises a dispensing unit (2) over a feed plate (4) below a hopper (13). In order to achieve a simple feeding device enabling precise regulation of an amount of feed for adjusting the device to animals of different sizes, the dispensing unit (2) comprises a tubular duct (7) the upper end of which having an area which is greater than the area of the outlet (12) of the hopper (13). In the hopper, a disc-shaped element (8) enabling outflow of feed (33) from the disc-shaped element to the inner (31) of the duct (7). Thus there will be no risk of humidity absorption from feed on the feed plate (4) to the feed in the hopper (13). The feed outflow occurs at an intermediate space (34) between the disc-shaped element and the hopper and in an intermediate space (10) between the disc-shaped element and the inner wall (11) of the duct when the animals exert a lateral pressure (35) on the dispensing unit (2). The dispensing unit (2) is suspended by a control rod (5) enabling reversal of the unit (2) to normal starting position (FIG. 8) after being subjected to a lateral pressure (FIG. 9).

23 Claims, 5 Drawing Sheets

U.S. PATENT DOCUMENTS

| | | | |
|---|---|---|---|
| 5,839,389 A | | 11/1998 | Fujii |
| 5,865,139 A | * | 2/1999 | Rasmussen ................ 119/53.5 |
| 5,906,174 A | * | 5/1999 | Muldoon .................... 119/54 |
| 6,053,124 A | * | 4/2000 | Kolbe .................... 119/51.01 |
| 6,116,471 A | * | 9/2000 | Miller ........................ 222/199 |
| 6,129,049 A | * | 10/2000 | Rasmussen et al. ....... 119/52.1 |
| 6,330,867 B1 | * | 12/2001 | Rasmussen ................ 119/52.1 |

* cited by examiner

AUTOMATIC FEEDING DEVICE

This application claims the benefit of Danish Application No. PA 2000 00787 filed May 15, 2000 and PCT/DK01/00339 filed May 15, 2001.

BACKGROUND OF THE INVENTION

The present invention concerns an automatic feeding device for feeding animals, preferably pigs, comprising a funnel-shaped feed hopper having a lower outlet connected to a dispensing unit to be actuated by noses of the animals when eating feed from a feed plate below the dispensing unit, the device comprising a disc-shaped element disposed transversely of the outlet of the hopper and having an area substantially corresponding to the area of the outlet.

DK utility model 94 00446 discloses a feeding device of the kind mentioned in the introduction. When an animal is hungry it pushes the lower end of the tube so that feed flows out on the feed plate. The lower end of the tube, which is a loose sleeve, is fastened to the control rod. This sleeve is arranged only for pendulum movement. This does not provide sure dosing of feed to animals of different sizes. As precise adjustment of the sleeve is difficult, dosage of small amounts for piglets will be particularly difficult.

From WO 93 13652 is known a feeding device for feeding pigs, having a distance adjusting mechanism connecting the upper end of the tubular feed hopper and a stationary construction member. This device functions by the animal, when hungry, presses its snout against the tube for moving it so that feed flows out from the tube.

A feeding device of the above kind has functioned particularly satisfactorily but certain disadvantages have appeared. Thus it appears to be difficult to provide a resilient tube having sufficient elasticity for smaller animals as, for example, piglets. Thus it will be difficult to adjust the feeding device optimally according to the force with which piglets may actuate the tube, and furthermore it will be costly to make such a device as resilient material for making the tube is relatively expensive. Furthermore, with very resilient tubes it will be difficult to dispense the feed in a secure and simple way.

DE patent 26 52 788 discloses another automatic feeding device where a relatively short tube piece is connected with a funnel-shaped hopper. In this construction, flexibility is achieved by means of a funnel-shaped sleeve connecting the hopper with the feed tube. Regulation of the discharged amount of feed is difficult in this construction as the entire hopper has to be displaced up and down on a frame. Furthermore, it will be difficult to regulate the amount of feed in a sufficiently simple and secure way as the yieldability in the tube will depend on the degree of filling and the amount of feed situated in the funnel-shaped sleeve.

Particularly when feeding piglets with feed having a large content of milk powder or particle-formed material, as for example ground grain, where fat has been absorbed in melted state, there is great risk that the feed gets lumpy and clogs the tube or the hopper. By the prior art constructions, no effective solution to this problem has been indicated.

SUMMARY OF THE INVENTION

The purpose of the present invention is to provide an automatic feeding device which is suited for feeding animals, particularly pigs, where it is possible to perform a precise regulation of the amount of discharged feed by simple means, so that the device may easily be adjusted to the size of the animals from weaning weight to slaughtering weight while simultaneously avoiding the risk of bridge formation and the risk of humidity absorption in the feed.

This is achieved by an automatic feeding device of the kind mentioned in the introduction which is peculiar in that dispensing unit comprises a tubular duct with an upper end having an area larger than the area of the outlet of the hopper, and that a slot is provided between the rim of the disc-shaped element, which is disposed at the upper end of the duct, and the inner wall of the duct, that the dispensing unit may be displaced vertically as it is mounted at a lower end of a control rod which extends through the inner of the hopper and which is fastened to the hopper and to the dispensing unit.

The feeding device according to the invention can be said to be an improved and alternative solution to the problems behind the prior art feeding devices according to the above three documents.

The dispensing device may be adjusted in a simple way in the vertical direction whereby the slot between the hopper and the disc-shaped plate may be changed. In a simple way, there may hereby be provided a dosing while the control rod, due to its extension up through the hopper, simultaneously induces stirring in the feed when the animals actuate the dispensing unit. Hereby the risk of bridge formation is avoided.

This risk is particularly avoided if a conical adapter is provided in the connection between the disc-shaped element and the control rod. Such a conical adapter will contribute to the stirring and thereby avoid the risk of bridge formation. Such a design is particularly important when the feeding device is used for feeding piglets where the feed has a high content of milk powder and/or fat. Due to the conical adapter, the feed will be led downwards and outwards when the animals eat of the feed plate and thereby actuate the dispensing unit as they, using their rummaging instinct, eat feed from the plate. Therefore, it is important that the dispensing unit is suspended at a very short distance above the feed plate so that the animals are automatically pushing the dispensing unit when they tale feed from the feed plate.

Another problem associated with the known automatic feeding devices and solved with the device according to the invention is absorption of humidity from the noses of the animals in the feed in the device. The plate creates distance between the feed in the hopper and feed raked out over the rim of the plate. Hereby the risk of humidity absorption is avoided in feed in the hopper, and thus the risk of bacterial growth in the feed stored in the hopper is avoided. Furthermore, risk of humidity concentration is avoided if the there is provided an annular recess around the discharge opening of the dispensing device so that the inner part of the duct is retracted relative to the lower edge are in practice it has appeared that possible humidity coming from the noses of the animals at the periphery of the lower edge region will not give rise to material clogging in or solidifying around the discharge opening.

According to an advantageous embodiment of the invention, the feeding device is peculiar in that the control rod is connected with means for elevating and lowering the duct at the upper end of the rod, and that the control rod is resilient and suspended displaceably by one or two mutually spaced tubular slide bushings fastened to the hopper.

By making a control rod of a resilient material and placing it in at least one slide bushing, this control rod may fulfill two objects simultaneously, namely setting the height of the dispensing unit above the feed plate and thereby regulating the amount of feed to be discharged, and the control rod providing for a greater or lesser elastic deflection of the dispensing unit by a given force acting on the lower end of the unit.

The control rod thus induces a resilient reversing of the dispensing unit which has appeared to be advantageous by feeding animals. When the animals induce a force in transverse direction, the first movement may occur as a pendulum movement due to tolerance differences at the fastening of the dispensing unit to the control rod. Alternatively, the control rod may be fixed to the dispensing unit so that any movement occurs as a resilient movement of the dispensing unit and thus always will move the unit back to a staring position.

The feeding principle of using a tube with a reversing force is known from the above documents and will therefore not be described. Only it is to be noted that resilient reversal has to occur so that the movement may be established by the animals eating feed supplied through an intermediate space which is delimited by the lower edge of the duct and a feed plate provided beneath it.

Furthermore, the resilient reversing movement transversely of the feed plate will prevent bridge formation or clogging of feed in the dispensing unit or the hopper. The control rod extending through the dispensing unit and the hopper will thus contribute to prevent clogging. This is particularly important in connection with feed having a high content of milk powder and/or fat.

As only the dispensing unit is suspended in the control rod, the resilient reversal force for the dispensing unit will be determined only by the flexibility of the control rod. As it is possible to purchase tubular spring steel rods in different dimensions, the desired elasticity may be achieved very simply. The dispensing unit can be made of a cheap rigid material.

Regulation of the automatic feeding device occurs in an uncomplicated way, just by displacing the dispensing unit vertically by means of the control rod, and when the feeding device is to accommodate animals in different sizes, this occurs in a simple way simply by changing the location of the slide bushing relative to the hopper and thereby in relation to the feed plate.

The dimension of the control rod may be varied, the length and the location of the slide bushing may be varied, as well as using two mutually spaced apart slide bushings is feasible. This enables accommodating an automatic feeding device according to the present invention to animals of different sizes. The feeding device may thus be adjusted for application to animals other than piglets.

The feeding device is advantageous in being suited for feeding piglets, which may actuate the discharge end of the tube with a small force, as well as large pigs or other animals, which may actuate the discharge end of the tube with a great force, only by adjusting the control rod.

BRIEF DESCRIPTION OF THE DRAWINGS

The present invention will be explained in more detail in the following with reference to the accompanying schematic drawing where.

DETAILED DESCRIPTION OF THE PREFERRED EMBODIMENTS

Figure 1:
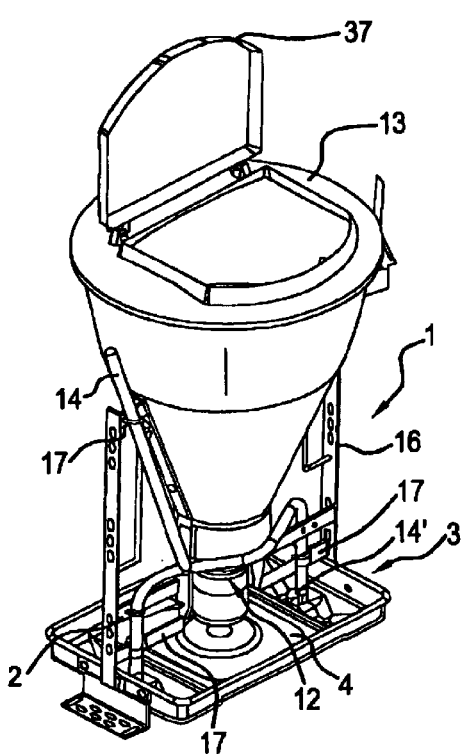
FIG. 1 shows a perspective view of an embodiment of an automatic feeding device according to the invention.

Identical or corresponding elements are provided with the same designations in the Figures of the drawing. Such elements are not explained in detail in connection with each Figure.

In the following, firstly is given a description of the embodiment illustrated in FIGS. 1–6. Then is given an explanation of the differences provided in the preferred embodiment illustrated in FIGS. 7–11. It is noted that the function is the same for both embodiments.

An automatic feeding device 1 according to the present invention comprises a dispensing unit 2 situated immediately over a base 3 which is provided with a feed plate 4. The dispensing unit 2 is mounted deflectable on a control rod 5 by means of a transverse rod 6 engaging a tubular duct 7 in the upper end of which there is disposed a disc-shaped element 8, the rim 9 of which forming a slot 10 together with the inner wall 11 of the duct. The disc-shaped element 8 has an area largely corresponding to the area of an outlet 12 from a hopper 13. The feeding device comprises a water system 14 with drinking nipples 14'.

The upper end of the duct 7 has a funnel-shape 15 having a dimension for receiving the outlet 12 from the hopper 13 which is arranged to contain feed. The hopper 13 may be filled manually or may be filled by means of automatic feed supply systems discharging at the top of the funnel-shaped hopper 13.

The hopper 13 is fastened to a frame 16 by means of rod connections 17 which are also used for fastening fittings 19,20 within the hopper 13. The fittings 19,20 serve to support the control rod 5 which is mounted in a slide bushing 18 for vertical displacement. The fitting 20 furthermore serves as support for a regulating means 21 for lifting and lowering the control rod 5.

The regulating means 21 consists of a bracket with fixing apertures 23 which can engage projections on a handle 24. The handle 24 is arranged for turning about a pivot which is fastened to the bracket 22 and is connected with the control rod 5 via a rod 26 through a mechanism 36 converting the rotation of the rod 26 to an upward and downward movement of the control rod. By swinging the handle 24, the control rod 5 may thus be lifted and lowered as the coupling mechanism 36 is disposed between the rods 5,26. This mechanism 36 is mounted on a plate 25 which is fastened to the frame 16 via a rod 17 and the fitting 20. The slide bushing 18 is fastened to a rod 38 extending crosswise of the hopper 13 and fastened via the fitting 19.

The control rod 5 extends through the hopper 13 and the inner of the dispensing unit 2. At its lower end 27, the control rod 5 is connected with the disc-shaped element 8 by fastening in a centre hole 28 through which the rod 5 extends. Furthermore, at its lower end 27, the rod is connected with the dispensing unit 2 by means of the transverse rod 6. The rod 6 is made symmetric of two diametrically directed branches 29. The branches 29 are fastened at the distal ends to the dispensing unit 2 by means of apertures 30 where they are welded. The transverse rod 6 is preferably made of round iron or flat bar and has small dimension in the longitudinal direction of the dispensing unit 2. As alternative to the rod 6, fittings with three or four branches may be used. However, the use of two branches 29 is preferred in order to achieve as small blocking as possible of the inner 31 of the duct 7.

Figure 3:
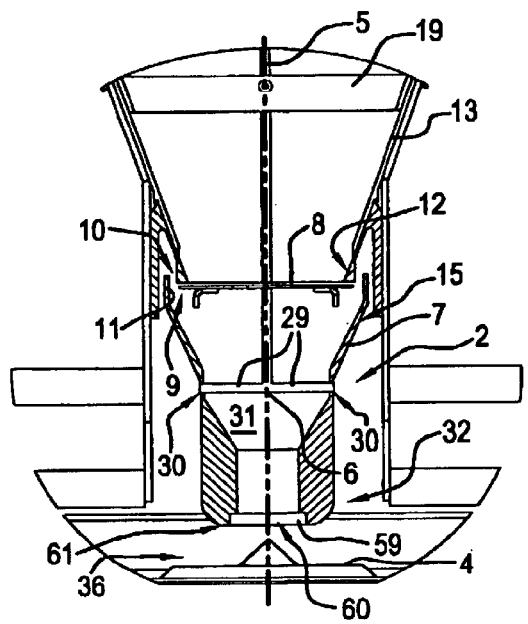
Figure 4:
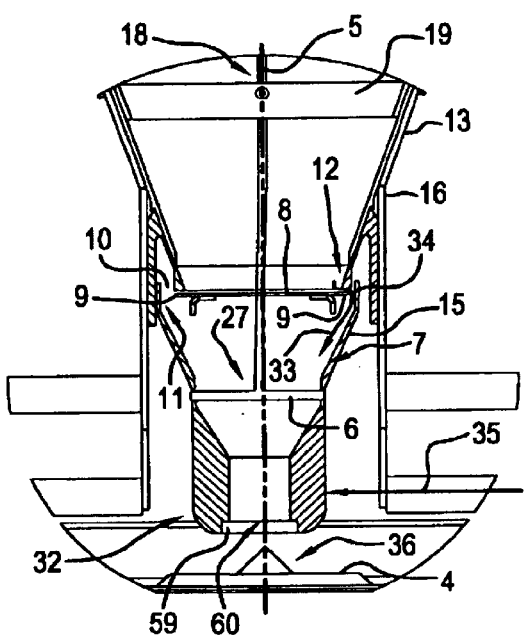
Figure 5:
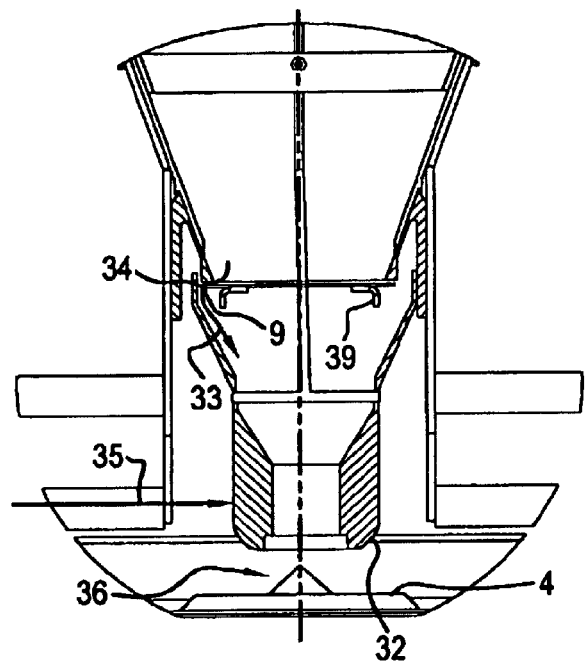
Figure 7:
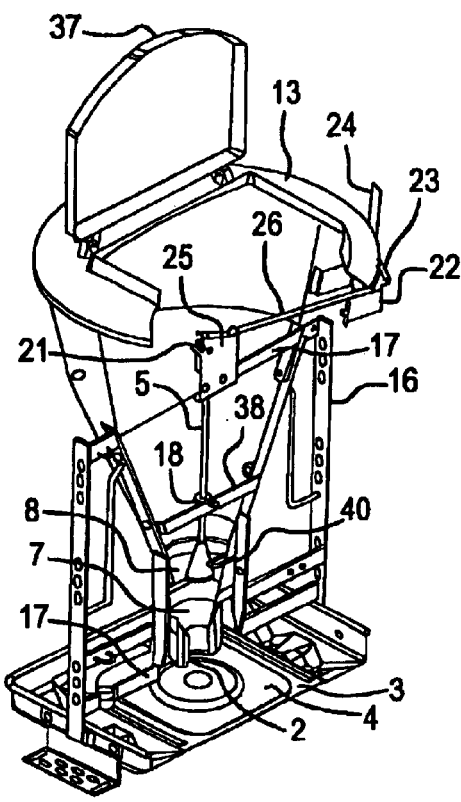
FIGS. 7–11 show views corresponding to FIGS. 2–6 of a preferred embodiment of an automatic feeding device according to the invention.

The control rod 5 is resilient and may deflect from the position with continuous lines in FIG. 3 to the positions shown with punctuated lines in FIGS. 4 and 5 when animals eating feed discharged on the feed plate 4 exert a pushing force 35 on the lower end 32 of the dispensing unit 2.

By the deflection, the intermediate space 34 between the rim 9 of the element 8 and the outlet 12 of the hopper 13 is changed so that feed may flow out over the rim 9 as indicated by 33 and down through the intermediate space 10 between the rim 9 and the inner wall 11 of the duct 7. At the same time, the control rod 5 induces stirring in the feed in the hopper 13 so that bridge formation is avoided.

At the deflection, the intermediate space 36 formed between the feed plate 4 and the lower end 32 of the dispensing unit 2 is enlarged. By varying the resiliency, possibility of adjustment of the dosed amount of feed is achieved.

The dispensing unit 2 will usually be made of metal but may also be made of plastic. The hopper 13, which is provided with a lid 37 in the shown embodiment, is preferably made of clear plastic so that the degree of filling of the device may be ascertained visually. Alternatively, the dispensing unit 2 and the hopper 13 may be made of other materials.

Figure 2:
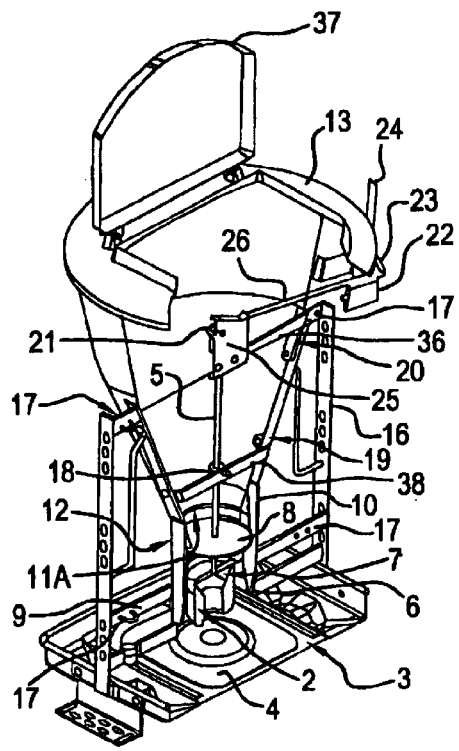
FIG. 2 shows a partial section through the device according to FIG. 1, FIGS. 3–5 show sectional views of the automatic feeding device with the dispensing unit in different positions relative to the hopper.

In FIG. 2 is seen a tubular slide bushing 18 which is fastened to the rod 38 in such a way that it may be displaced up and down and retained at different elevations. Hereby, the free length of the control rod 5 may be adjusted whereby a greater or lesser flexibility may be achieved, thus accommodating to larger or smaller animals. Alternatively, it is possible to adjust the resiliency by substituting the control rod 5 with a corresponding control rod having other dimensions or deflection properties.

Figure 6:
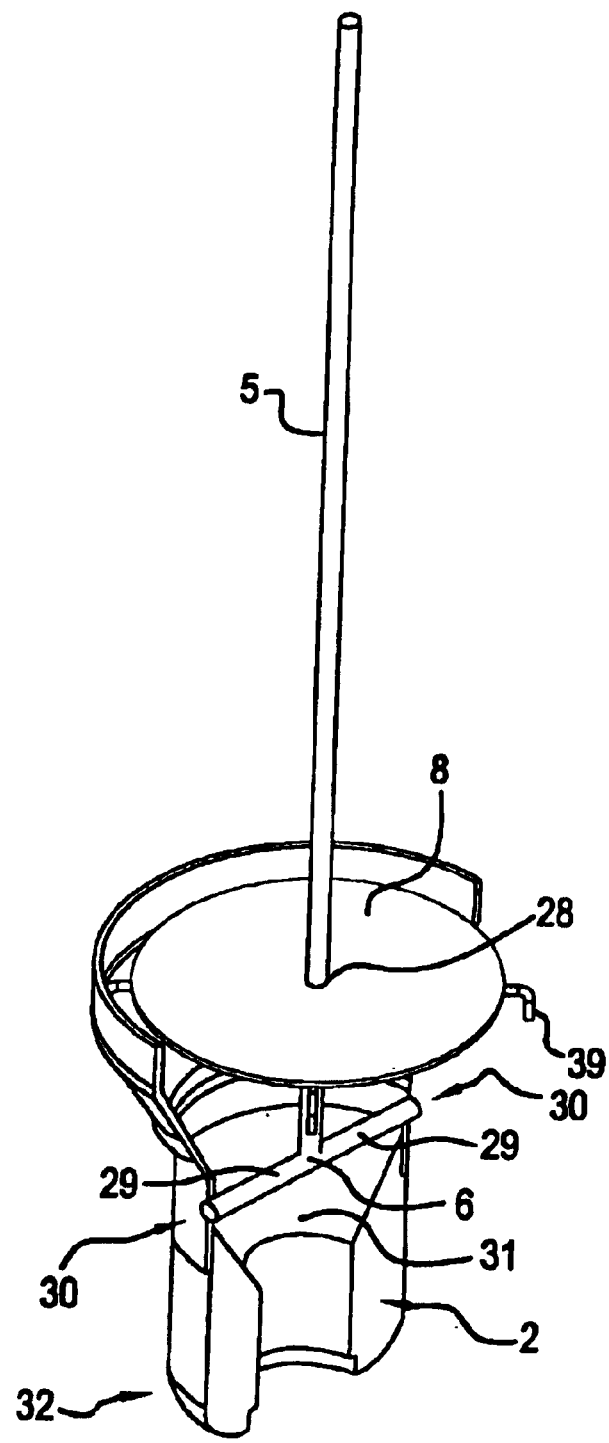
FIG. 6 shows a view, partly in section, of a detail of the feeding device.
Figure 8:
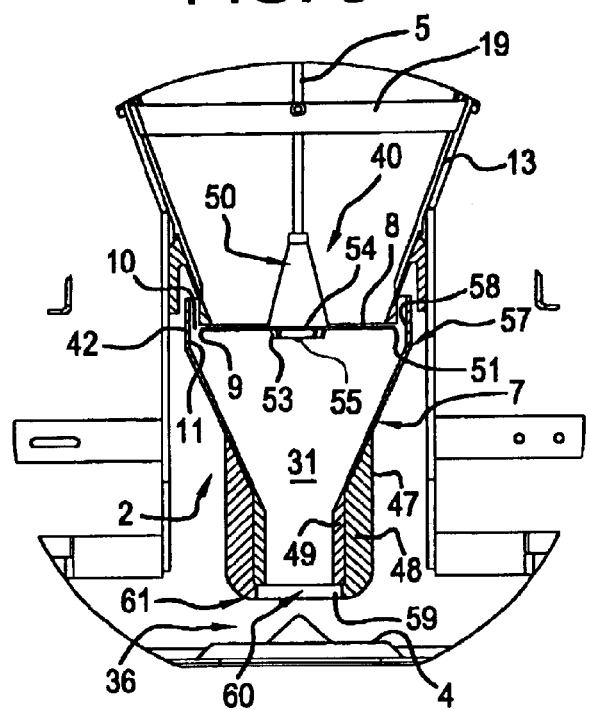
Figure 9:
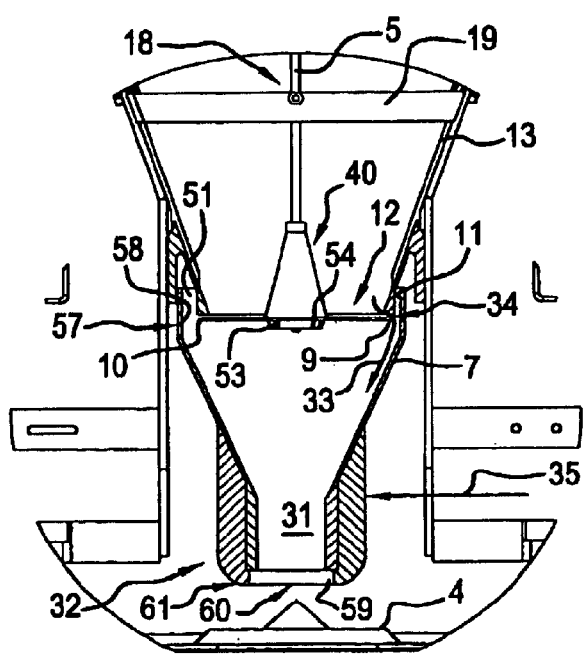
Figure 10:
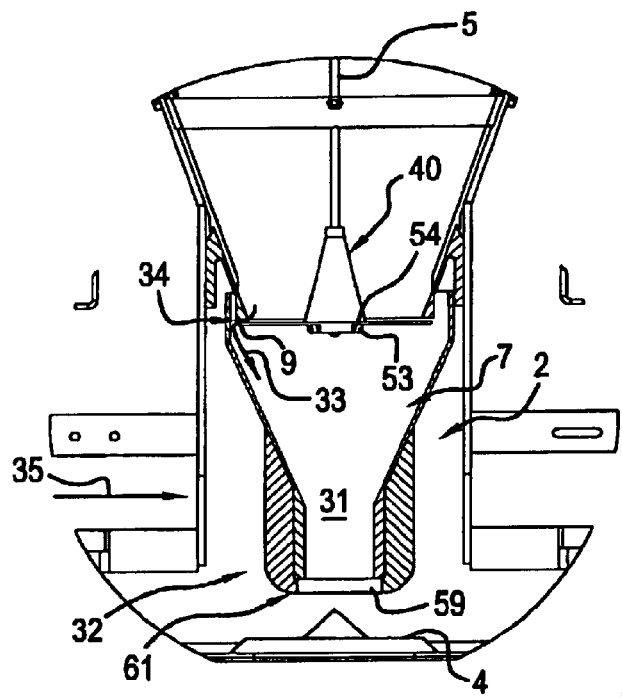
Figure 11:
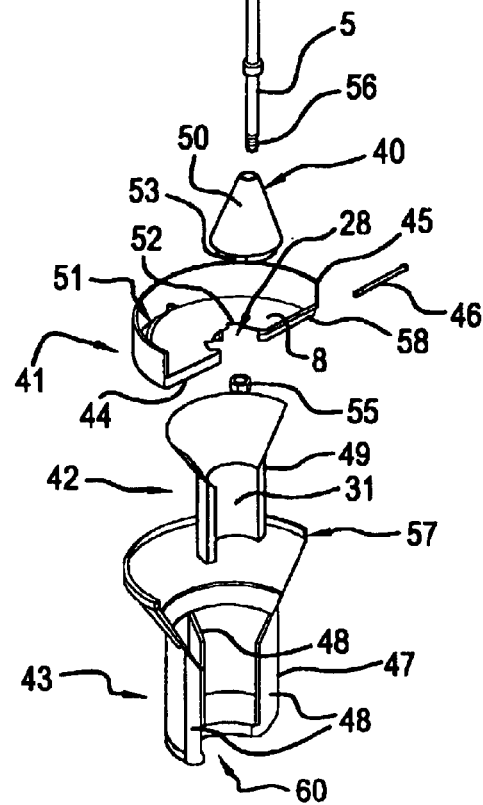

FIG. 6 shows a view of the dispensing unit itself 2. It is seen that under the plate 8 there are provided pins 39 used for welding the plate 8 to the inner wall 11 of the duct.

The preferred embodiment illustrated in FIGS. 7–11 differs primarily in being provided with an adapter 40 used for connecting the control rod 5 with the dispensing unit 2. Furthermore, the dispensing unit 2 is built up from three separate plastic elements 41,42 and 43 (see FIG. 11). The first element 41 comprises the disc-shaped element 8 which is fastened to an annular element 45 via ribs 44. A locking pin 46 interacts with the ribs 44 and secures the dispensing unit 2 against rotating. The element 43 comprises an outer tube 47 provided at its inner side with ribs 48 which extend in the axial direction of the tube. The element 42 comprises an inner tube 49 which is intended for placing inside the outer tube and in contact with the ribs 48. The shape of the construction is designed with the purpose of production by injection moulding in plastic, and the three elements 41–43 are provided with engaging means so that they may be snapped together and constitute one dispensing unit 2. The snapping together occurs by a bead 57 and the element 43 engaging a recess 58 on the element 41 as the element 42 is then situated between the two mutually snapped elements. At its upper end, the adapter 40 is provided with a conical surface 50 contributing to secure stirring in the feed for avoiding bridge formation. The conical surface 50 will also contribute to guide the feed outward towards a slot 51 between the disc-shaped element 8 and the annular wall 45.

The adapter interacts with a centre hole 28 provided with notches 52 along the periphery. The notches 52 interact with ribs 53 at the lower part of the adapter 40. The ribs 53 are brought through the notches 52 whereafter the dispensing unit 2 is rotated relative to the adapter 40 as the disc-shaped element 8 is situated in a ring-shaped groove 54 (see FIGS. 8–9). When the ribs 53 are brought to a position where they are not aligned with the notches, a mutual locking may be established, for example by means of snap features or by means of the locking pin 46.

A nut 55 is screwed firmly into a thread 56 at the bottom of the control rod 5 for fastening the adapter 40.

By cleaning or other servicing, it is thus possible to dismount the dispensing unit in a simple way by releasing the coupling means between the adapter and the dispensing unit, thus disengaging the coupling which is functioning as a bayonet coupling. This may occur in a simple way without using tools.

As a common feature of both embodiments there is provided a recess 59 surrounding the discharge opening 60 of the dispensing unit. Humidity from the snouts of the animals deposited on the rim area 61 will hereby not give rise to solid deposits of feed and thereby risk of bacterial growth. In practice it appears that the discharge opening 60 is kept clean by using the recess 59.

What is claimed is:

1. An automatic feeding device for feeding animals, preferably pigs, comprising a funnel-shaped feed hopper having a lower outlet connected to a dispensing unit to be actuated by noses of the animals when eating feed from a feed plate below the dispensing unit, the device comprising a disc-shaped element disposed transversely of the outlet of the hopper and having an area substantially corresponding to an area of the outlet, wherein the dispensing unit further comprises a tubular duct with an upper end having an area larger than the area of the outlet of the hopper, and a slot provided between a rim of the disc-shaped element disposed at the upper end of the duct, and an inner wall of the duct, the dispensing unit being displaceable vertically as it is mounted at a lower end of a control rod which extends through an interior of the hopper and which is fastened to the hopper and to the dispensing unit, and wherein said rod is resilient and suspended further comprising mutually spaced tubular slide bushings fastened to the hopper, wherein the dispensing unit and the rod are deflectable for tipping the disc-shaped element with respect to the outlet of the hopper thereby providing for an elastic deflection of the dispensing unit by a given force in traverse direction acting on a lower end of the dispensing unit to enable feed to flow from the hopper through the dispensing unit to the feed plate.

2. A device according to claim 1, wherein the control rod is connected with means for elevating and lowering the duct at the upper end of the rod.

3. A device according to claim 2, wherein the tubular slide bushing is arranged to be slid up and down relative to the hopper so that the free length of the control rod is increased or decreased.

4. A device according to claim 1, wherein the tubular duct and the disc-shaped element are circular, that the rod extends along a center axis of the duct, and that the disc-shaped element is fastened to the rod via a center hole.

5. A device according to claim 1, wherein the tubular duct has a downwardly narrowing area and is preferably made with an outer tube and inner tube which are spaced apart by ribs formed on one of the tubes.

6. A device according to claim 1, wherein the disc-shaped element of the dispensing unit and the tubular duct are made up of at least two injection molded elements that are snapped together.

7. A device according to claim 1, wherein the dispensing unit has a discharge opening having an annular recess around the discharge opening enabling the duct to be retracted in relation to a lower rim region around the discharge opening.

8. A device according to claim 1, wherein the hopper is mounted in a frame provided with the feed plate which is fastened to the frame.

9. A device according to claim 4, wherein the disc-shaped element is connected with the control rod via a conical adapter mounted on the disc-shaped element via a releasable connection.

10. A device according to claim 9, further comprising notches in a periphery of the center hole, wherein the releasable connection is a bayonet coupling and wherein plural ribs on the conical adapter pass through the notches in the periphery of the center hole and are turned into engagement with the disc-shaped element.

11. An automatic feeding device for feeding animals comprising a funnel-shaped feed hopper for receiving feed, the feed hopper having a lower outlet communicating with a displaceable dispensing unit, a feed plate below the dispensing unit, the dispensing unit being actuatable by noses of the animals eating feed from the feed plate, the dispensing unit further comprising a tubular duct with an upper end having an area larger than an area of the outlet of the hopper, a disc-shaped element disposed transversely of the outlet of the hopper and having an area substantially corresponding to the area of the outlet, a slot provided between a rim of the disc-shaped element disposed at the upper end of the duct and an inner wall of the duct, a resilient elastically deflectable control rod extending through an interior of the hopper, the control rod being coupled to the hopper, the disc-shaped element and the dispensing unit, mutually spaced tubular slide bushings fastened to the hopper and coupled to the rod for suspending the rod in the hopper and allowing the rod to elastically deflect, a traverse rod on the control rod for mounting the dispensing unit at a lower end of the control rod such that the control rod and the dispensing unit are displaceable across a vertical axis, the dispensing unit being elastically deflectable by a force in transverse direction acting on a lower end of the dispensing unit for moving a part of the disc-shaped element away from the lower outlet of the hopper thereby enabling feed to flow from the lower outlet of the hopper out a rim of the disc-shaped element and through the dispensing unit to the feed plate.

12. An automatic feeding device for feeding animals comprising a funnel-shaped feed hopper for receiving feed, the feed hopper having a lower outlet communicating with a displaceable dispensing duct, a feed plate below the dispensing duct, the dispensing duct being movable by noses of the animals eating feed from the feed plate, the dispensing duct further having an upper end area larger than an area of the outlet of the hopper, a disc having a rim disposed transversely of the outlet of the hopper and having an area substantially corresponding to the area of the outlet, a slot provided between the rim of the disc and an inner wall of the duct, a resilient elastically deflectable control rod extending through an interior of the hopper, the control rod being coupled to the hopper, the disc and the dispensing duct, the dispensing duct being elastically deflectable by a force in transverse direction acting on a lower end of the dispensing duct for elastically moving the control rod and thereby moving at least a portion of the disc away from the outlet of the hopper for flowing feed from the hopper thereby enabling feed to flow from the lower outlet of the hopper over the rim of the disc through the dispensing duct to the feed plate.

13. The device of claim 12, further comprising mutually spaced tubular slide bushings fastened to the hopper and coupled to the rod for suspending the rod in the hopper and allowing the rod to elastically deflect, a traverse rod on the control rod for mounting the dispensing duct at a lower end of the control rod such that the control rod and the dispensing duct are elastically displaceable.

14. The device of claim 12, further comprising means connected to the control rod for elevating and lowering the duct at an upper end of the rod.

15. The device of claim 13, wherein the tubular slide bushings are slidable up and down relative to the hopper for increasing or decreasing a free length of the control rod.

16. The device of claim 12, wherein the duct is tubular and the duct and the disc are circular, and wherein the control rod extends along a center axis of the duct, and the disc is fastened to the control rod via a center hole.

17. The device of claim 16, wherein the tubular duct has a downwardly narrowing area.

18. The device of claim 17, wherein the tubular duct comprises an outer tube and inner tube spaced apart by ribs formed on one of the tubes.

19. The device of claim 12, wherein the disc and the dispensing duct are made up of at least two injection molded elements that are snapped together.

20. The device of claim 12, wherein the dispensing duct has a discharge opening having an annular recess around the discharge opening enabling the duct to be retracted in relation to a lower rim region around the discharge opening.

21. The device of claim 12, further comprising a frame, wherein the hopper is mounted on the frame and wherein the feed plate is fastened to the frame.

22. The device of claim 16, further comprising a conical adapter releasably mounted on the disc via a releasable connection, and wherein the disc is connected to the control rod via the conical adapter.

23. The device of claim 22, further comprising notches in a periphery of the center hole, wherein the releasable connection is a bayonet coupling and wherein plural ribs on the conical adapter pass through the notches in the periphery of the center hole and are turned into engagement with the disc.

* * * * *